United States Patent
Zhang (10) Patent No.: US 8,373,982 B2
(45) Date of Patent: Feb. 12, 2013

(54) COMPUTER DEVICE

(75) Inventor: Yang Zhang, Shanghai (CN)

(73) Assignee: Inventec Corporation, Taipei (TW)

( * ) Notice: Subject to any disclaimer, the term of this patent is extended or adjusted under 35 U.S.C. 154(b) by 291 days.

(21) Appl. No.: 12/978,410

(22) Filed: Dec. 24, 2010

(65) Prior Publication Data

US 2012/0134095 A1    May 31, 2012

(30) Foreign Application Priority Data

Nov. 30, 2010 (TW) ............................... 99141535 A (51) Int. Cl.
*H05K 5/00* (2006.01)
*H05K 7/16* (2006.01)
*H05K 7/14* (2006.01)
*H01R 4/00* (2006.01)
*H01R 13/46* (2006.01)

(52) U.S. Cl. ............ 361/679.33; 361/679.39; 361/679.4; 361/724; 361/725; 361/726; 174/542; 174/559; 174/59

(58) Field of Classification Search .. 361/679.31–679.4, 361/679.55–679.6, 724–727; 174/363–387, 174/542, 559–563, 59–64, 138 B, 138 D, 174/170; 439/157, 60, 152–153, 327, 328, 439/331

See application file for complete search history.

(56) References Cited

U.S. PATENT DOCUMENTS

| | | | |
|---|---|---|---|
| 6,621,692 B1 * | 9/2003 | Johnson et al. | 361/679.55 |
| 2003/0042824 A1 * | 3/2003 | Coffin et al. | 312/223.2 |
| 2008/0164795 A1 * | 7/2008 | Peng et al. | 312/334.5 |

* cited by examiner

*Primary Examiner* — Zachary M Pape
*Assistant Examiner* — Jerry Wu
(74) *Attorney, Agent, or Firm* — Jianq Chyun IP Office (57) ABSTRACT

A computer device includes a chassis, a rail disposed in the chassis, an electronic module slidably disposed on the rail, a cable set connected to the electronic device and a cable arranging module. The cable arranging module includes a fixed frame and a flexible frame. The fixed frame extends along a first axis parallel to and under the rail. The flexible frame is connected between the fixed frame and the electronic module. The cable set is located in the fixed frame and the flexible frame. When the electronic module is located in the chassis, a part of the flexible frame is supported on the rail and located on a second axis parallel to the first axis. When the electronic module slides out from the chassis, the flexible frame supported on the rail moves away from the rail along the second axis and at least partially moves to the first axis.

6 Claims, 7 Drawing Sheets

COMPUTER DEVICE

CROSS-REFERENCE TO RELATED APPLICATION

This application claims the priority benefit of Taiwan application serial no. 99141535, filed on Nov. 30, 2010. The entirety of the above-mentioned patent application is hereby incorporated by reference herein and made a part of this specification.

BACKGROUND OF THE INVENTION

1. Field of the Invention

The present invention relates to a computer device, and more particularly to a computer device having a removable electronic module.

2. Description of Related Art

A server is a core computer that serves all computers in a network system, which can provide functions such as disk and printing services required by network users and at the same time can enable all clients to share all resources in the network environment. A basic architecture of a server is basically the same as a common personal computer, which is formed of members such as a central processing unit (CPU), a memory, and input/output (I/O) equipment, which are connected inside through a bus, for example, the CPU and the memory are connected through a north bridge chip, and the I/O equipment is connected through a south bridge chip. The server has experienced about three evolutionary processes in terms of the chassis structure: a chassis in a tower shape in an early stage, a rack-mount chassis that emphasizes centralized performance, and a blade server using a high density computing mode.

Taking a rack-mount server as an example, a rack-mount server is a server having an appearance designed according to a uniform standard, so as to be used in combination with a cabinet. A rack-mount type may be regarded as a tower-shaped server having an optimized structure, and the design goal thereof is to reduce the occupation of the server space as much as possible. A lot of professional network equipment uses the rack-mount type structure, most of which have a flat shape like a drawer, such as a switch, a router, and a hardware firewall. The rack-mount server has a width of 19 inches, and a height using a unit U (1 U=1.75 inches=44.45 millimeters), and generally servers in standards such as 1 U, 2 U, 3 U, 4 U, 5 U, 7 U exist.

The size of the cabinet usually also uses a general industrial standard, usually from 22 U to 42 U. Inside the cabinet, detachable sliding bracket is provided according to the U height, and a user can flexibly adjust the height according to the elevation of the server, so as to store network equipment such as a server, a concentrator, and a disk array cabinet. After the server is placed, all I/O lines thereof are guided out from a rear side of the cabinet (all interfaces of the rack-mount server are also at the rear side) and placed in trunking of the cabinet together, which are usually labeled with numbers for ease of management.

For a server having a removable hard disk module, when the hard disk module moves relative to the chassis, the cable connected to the hard disk module also moves or bends. If the cable is not suitably fixed and thus moves or bends irregularly, the cable might fall off from the hard disk module. Therefore, it becomes an important topic to maintain the degree of freedom of bending of the cable while preventing the cable from falling off from the hard disk module.

SUMMARY OF THE INVENTION

The present invention is directed to a computer device, a cable arranging module of which is able to prevent a cable set from falling off.

The present invention provides a computer device, which includes a chassis, a rail, an electronic module, a cable set, and a cable arranging module. The rail is disposed in the chassis. The electronic module is slidably disposed on the rail and suitable for sliding out from the chassis along the rail. The cable set is connected to the electronic module. The cable arranging module includes a fixed frame and a flexible frame. The fixed frame is disposed in the chassis and extends along a first axis. The first axis is parallel to an extending direction of the rail and under the rail. The flexible frame is connected between the fixed frame and the electronic module. The fixed frame and the flexible frame form a containing space, and the cable set is located in the containing space. When the electronic module is located in the chassis, a part of the flexible frame is supported on the rail and located on a second axis parallel to the first axis. When the electronic module slides out from the chassis along the rail, the flexible frame supported on the rail moves away from the rail along the second axis and at least partially moves to the first axis, and a part of the cable set bends with the flexible frame.

In an embodiment of the present invention, the computer device is a server, and the electronic module is a hard disk module.

In an embodiment of the present invention, the hard disk module has a backplane, the backplane has a plurality of connectors, the cable set includes a plurality of cables, and the cables are connected to the connectors, respectively.

In an embodiment of the present invention, the computer device further includes a motherboard module, the motherboard module is disposed in the chassis, and the cable arranging module is located between the motherboard module and the hard disk module.

In an embodiment of the present invention, the computer device further includes an adaptor board, the adaptor board is disposed in the chassis, and the cable set is connected between the adaptor board and the hard disk module.

In an embodiment of the present invention, the fixed frame includes a body and a plurality of position-limiting arms. The position-limiting arms extend out from the body, and a part of the cable set is limited on the body by the position-limiting arms.

In an embodiment of the present invention, the flexible frame includes a plurality of pivotal connecting pieces, the pivotal connecting pieces are pivotally connected in sequence to form a chain structure, each pivotal connecting piece has at least a position-limiting arm, and a part of the cable set is limited on the pivotal connecting pieces by the position-limiting arms.

In an embodiment of the present invention, the electronic module has a connecting point, the cable set is connected to the connecting point, and when the electronic module is located in the chassis, the connecting point is located above the rail.

In an embodiment of the present invention, the electronic module has a boss at the connecting point, the cable arranging module further includes a connecting rod, an end of the connecting rod is pivotally connected to the boss, and the other end of the connecting rod is pivotally connected to the chain structure.

In an embodiment of the present invention, the cable set includes a power line and a plurality of data transmission lines.

As discussed above, the cable arranging module of the present invention is formed by the fixed frame and the flexible frame, and the cable set is fixed at the fixed frame and the flexible frame. When the electronic module moves relative to the chassis along the rail, partial segments of the cable set bend with the flexible frame to enable that the whole structure has a sufficient degree of freedom in actuation. An end of the flexible frame is connected to the electronic module, so as to maintain relative positions of the end of the cable set and the electronic module, so the cable set does not fall off from the electronic module due to movement of the electronic module. In addition, the flexible frame is partially supported on the rail and moves along the rail, so as to prevent the flexible frame from irregular bending, thus further reducing the probability that the cable set falls off from the electronic module.

In order to make the features and advantages of the present invention more comprehensive, the embodiments are illustrated in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
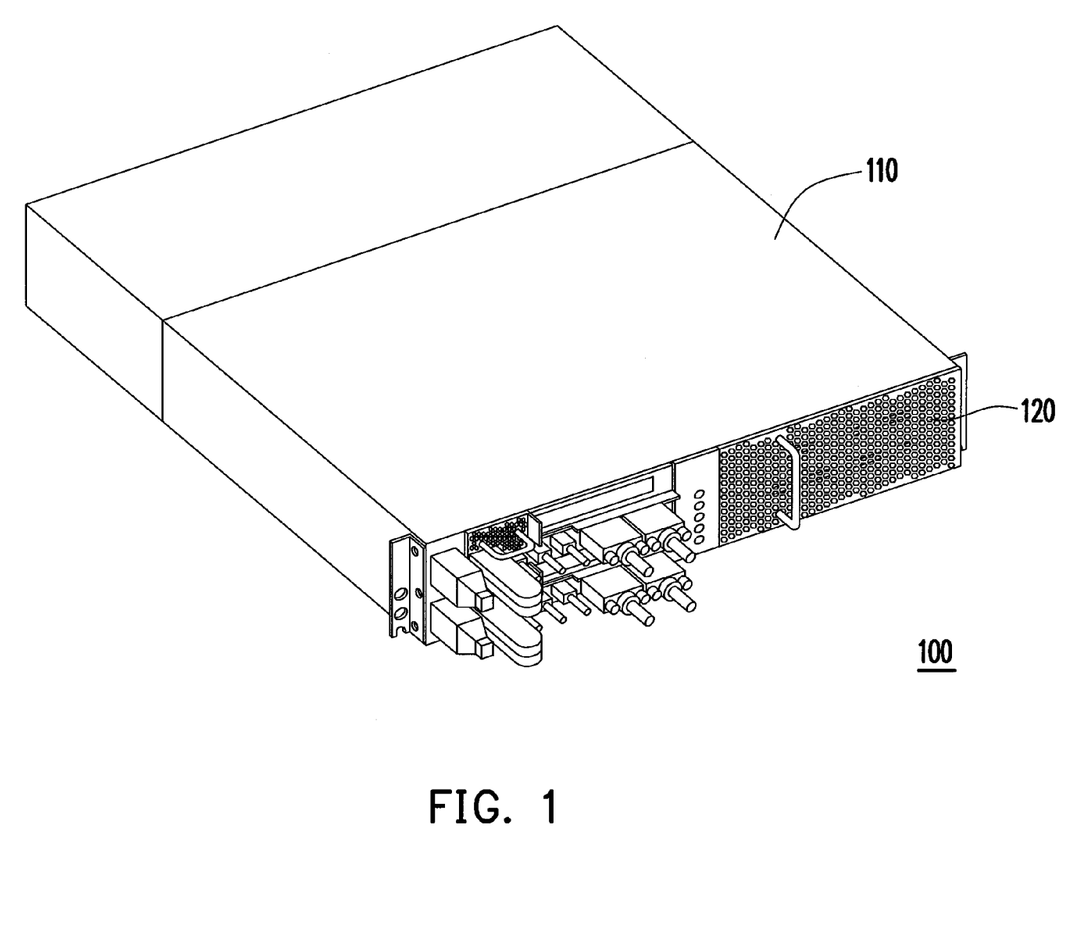
FIG. 1 is a 3D view of a computer device according to an embodiment of the present invention.
Figure 2:
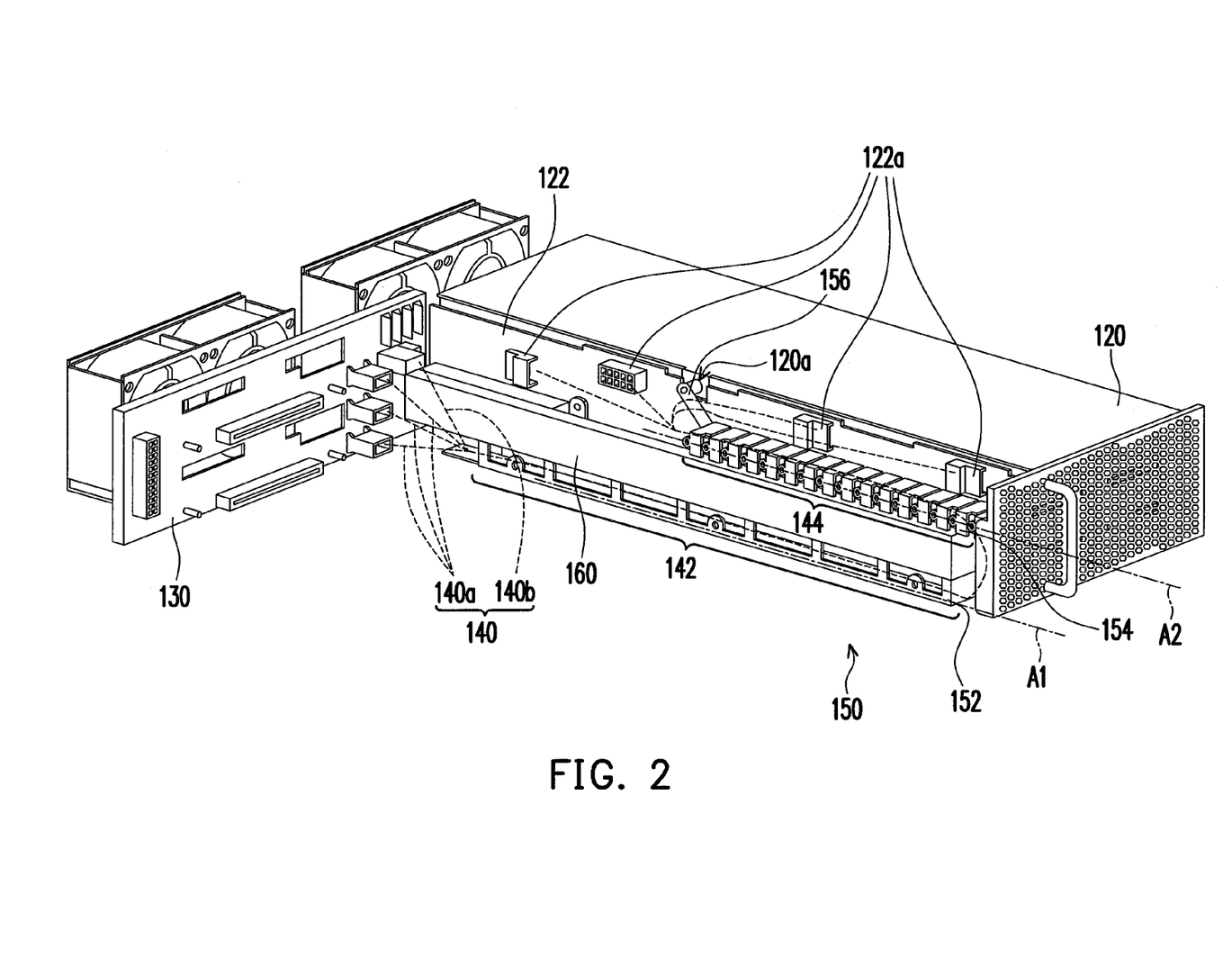
FIG. 2 is a 3D view of partial members of the computer device in FIG. 1.

FIG. 1 is a 3D view of a computer device according to an embodiment of the present invention. FIG. 2 is a 3D view of partial members of the computer device in FIG. 1. In order to make the drawings more clear, a cable set 140 in FIG. 2 is illustrated by dotted lines. Referring to FIGS. 1 and 2, a computer device 100 in this embodiment includes a chassis 110, an electronic module 120, an adaptor board 130, a cable set 140, a cable arranging module 150, and a rail 160. The electronic module 120 is slidably disposed on the rail 160 and suitable for sliding out from the chassis 110 along the rail 160. The electronic module 120 has a connecting point 120a. When the electronic module 120 is located in the chassis 110 as shown in FIG. 2, the connecting point 120a is located above the rail 160. The adaptor board 130 is dispose in the chassis 110. The cable set 140 has a first segment 142 and a second segment 144, the first segment 142 is connected to the adaptor board 130, and the second segment 144 is connected to the electronic module 120. The cable arranging module 150 includes a fixed frame 152 and a flexible frame 154. The fixed frame 152 is disposed in the chassis 110 and extends along a first axis A1, and the first axis A1 is parallel to an extending direction of the rail 160 and located below the rail 160. Two ends of the flexible frame 154 are connected to the fixed frame 152 and the electronic module 120, respectively. The fixed frame 152 and the flexible frame 154 form a containing space, and the cable set 140 is located in the containing space. Each first segment 142 is fixed at the fixed frame 152. Each second segment 144 is fixed at the flexible frame 154. In this embodiment, the computer device 100 is, for example, a server, and the electronic module 120 is, for example, a removable hard disk module.

Figure 3:
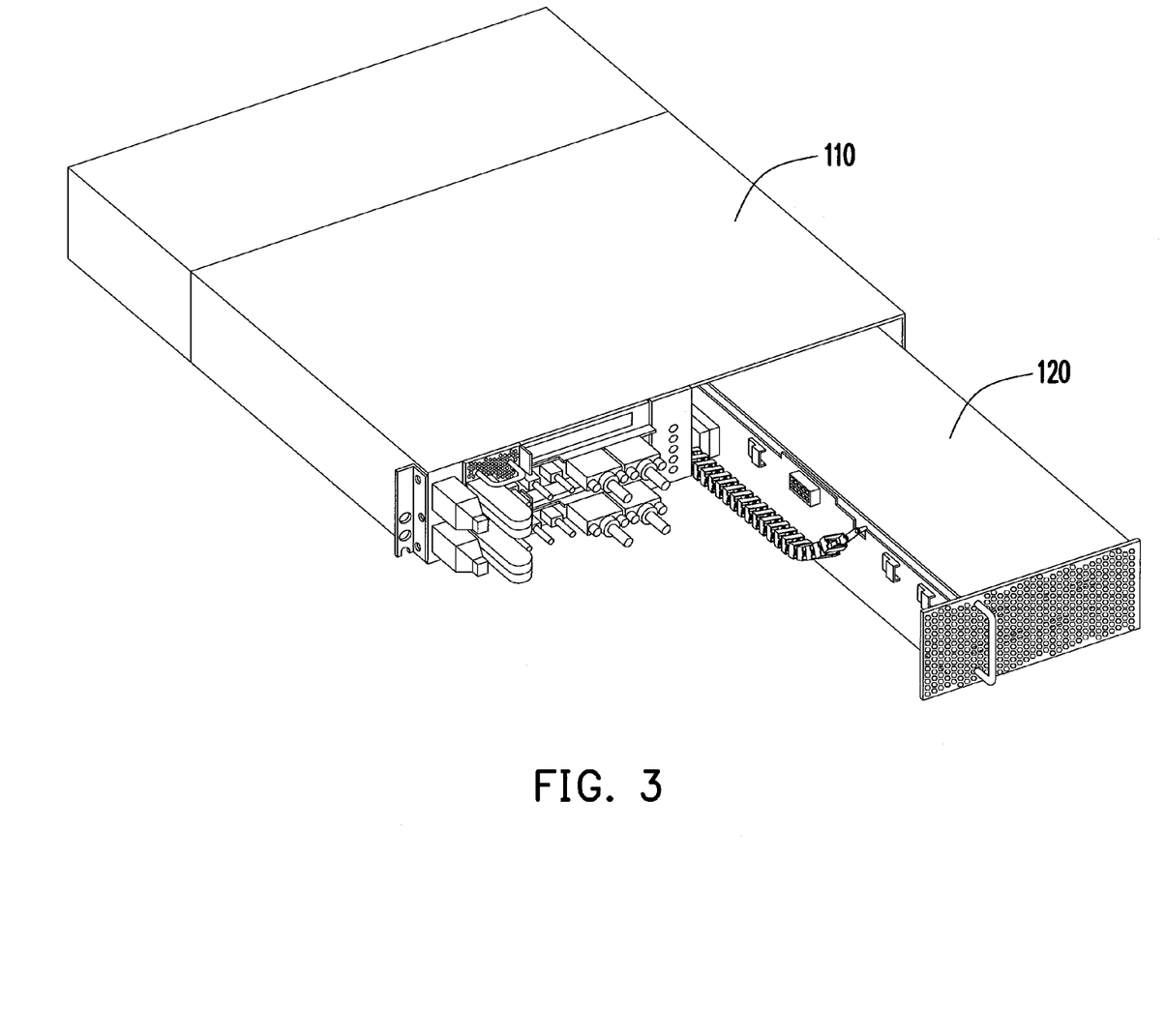
FIG. 3 is a 3D view when an electronic module in FIG. 1 is drawn out from a chassis.
Figure 4:
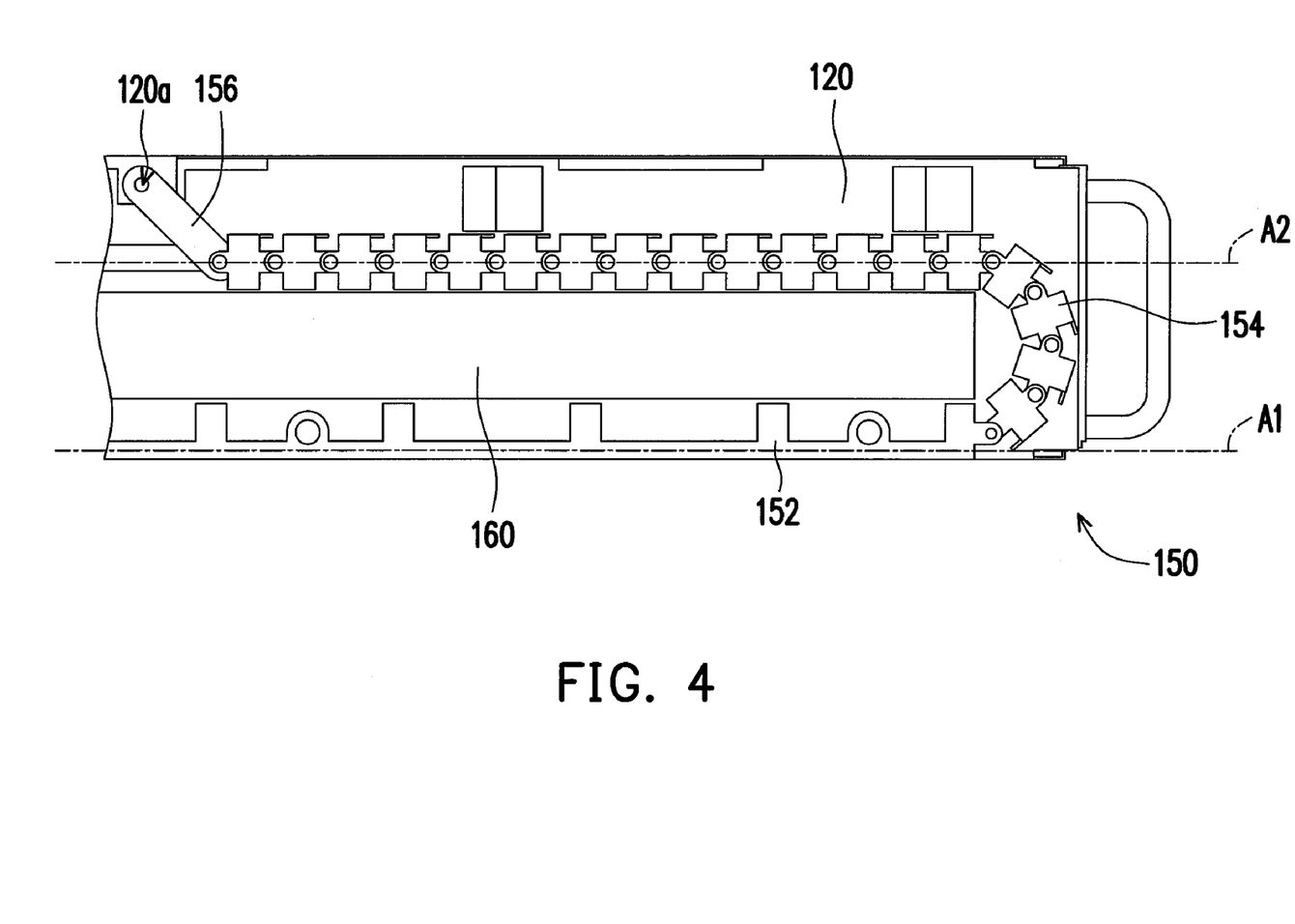
FIG. 4 is a partial side view of a cable arranging module in FIG. 1.
Figure 5:
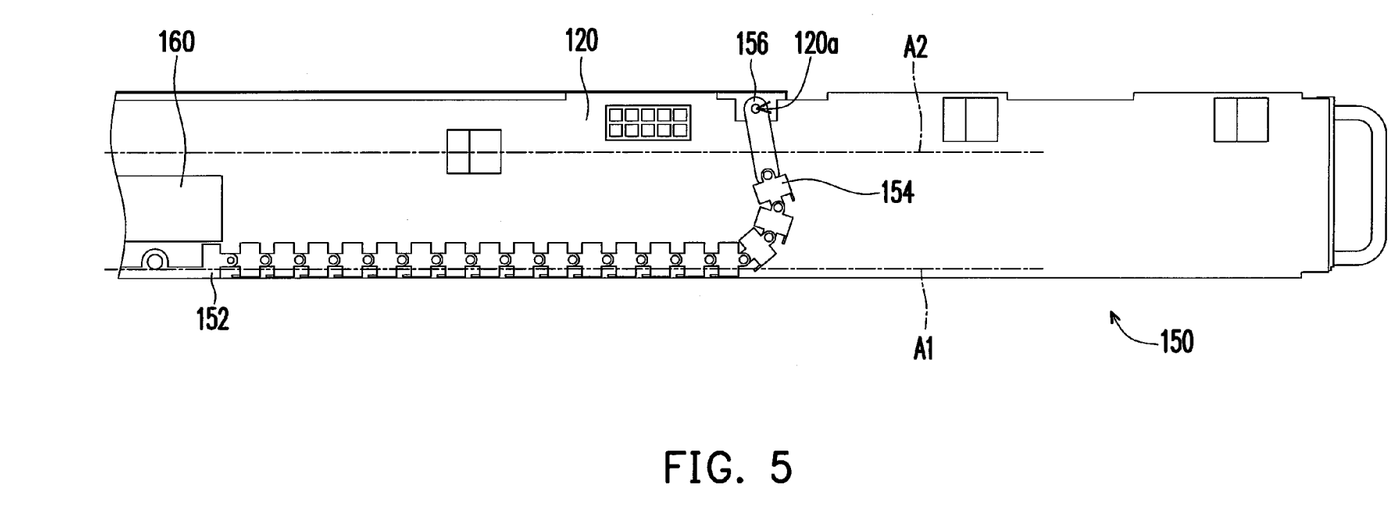
FIG. 5 is a partial side view of a cable arranging module in FIG. 3.

FIG. 3 is a 3D view of the electronic module in FIG. 1 drawn out from the chassis. FIG. 4 is a partial side view of the cable arranging module in FIG. 1. FIG. 5 is a partial side view of the cable arranging module in FIG. 3. When a user draws the electronic module 120 out from the chassis 110 (as shown in FIGS. 3 and 5) or pushes the electronic module 120 into the chassis 110 (as shown in FIGS. 1 and 4), an end of the flexible frame 154 connected to the electronic module 120 is actuated to move relative to the chassis 110 move. In this process, each second segment 144 (as depicted in FIG. 2) bends with the flexible frame 154, so the whole structure has a sufficient degree of freedom in actuation. As the end of the flexible frame 154 is connected to the electronic module 120, so the relative positions of the cable set 140 (as depicted in FIG. 2) and the electronic module 120 are maintained, thus ensuring that the cable set 140 does not fall off from the electronic module 120 due to movement of the electronic module 120.

In addition, as shown in FIGS. 2 and 4, when the electronic module 120 is located in the chassis 110, a part of the flexible frame 154 is supported on the rail 160 and located on a second axis A2 parallel to the first axis A1. When the electronic module 120 slides out from the chassis 110 along the rail 160, the flexible frame 154 supported on the rail 160 moves away from the rail 160 along the second axis A2 and at least partially moves to the first axis A1 (as shown in FIG. 5). Therefore, during actuation in FIGS. 4 and 5, the flexible frame 154 moves along the rail 160, so as to prevent the flexible frame 154 from irregular bending, thus further reducing the probability that the cable set 140 falls off from the electronic module 120.

Referring to FIG. 2, in particular, the cable set 140 in this embodiment is formed of a plurality of cables, the cables include a plurality of data transmission lines 140a and a power line 140b. The electronic module 120 has a backplane 122, the backplane 122 has a plurality of connectors 122a and is connected to the cable set 140 through the connectors 122a, so as to perform the transmission of data and power. The data transmission lines 140a and the power line 140b are fixed at the flexible frame 154 and extend out from an end of the flexible frame 154 to be connected to the backplane 122. The end of the flexible frame 154 is fixed at the electronic module 120, so as to maintain relative positions of line segments of the data transmission lines 140a and the power line 140b at the end and the electronic module 120, thus reducing the probability that the data transmission lines 140a and the power line 140b fall off from the electronic module 120.

Figure 6:
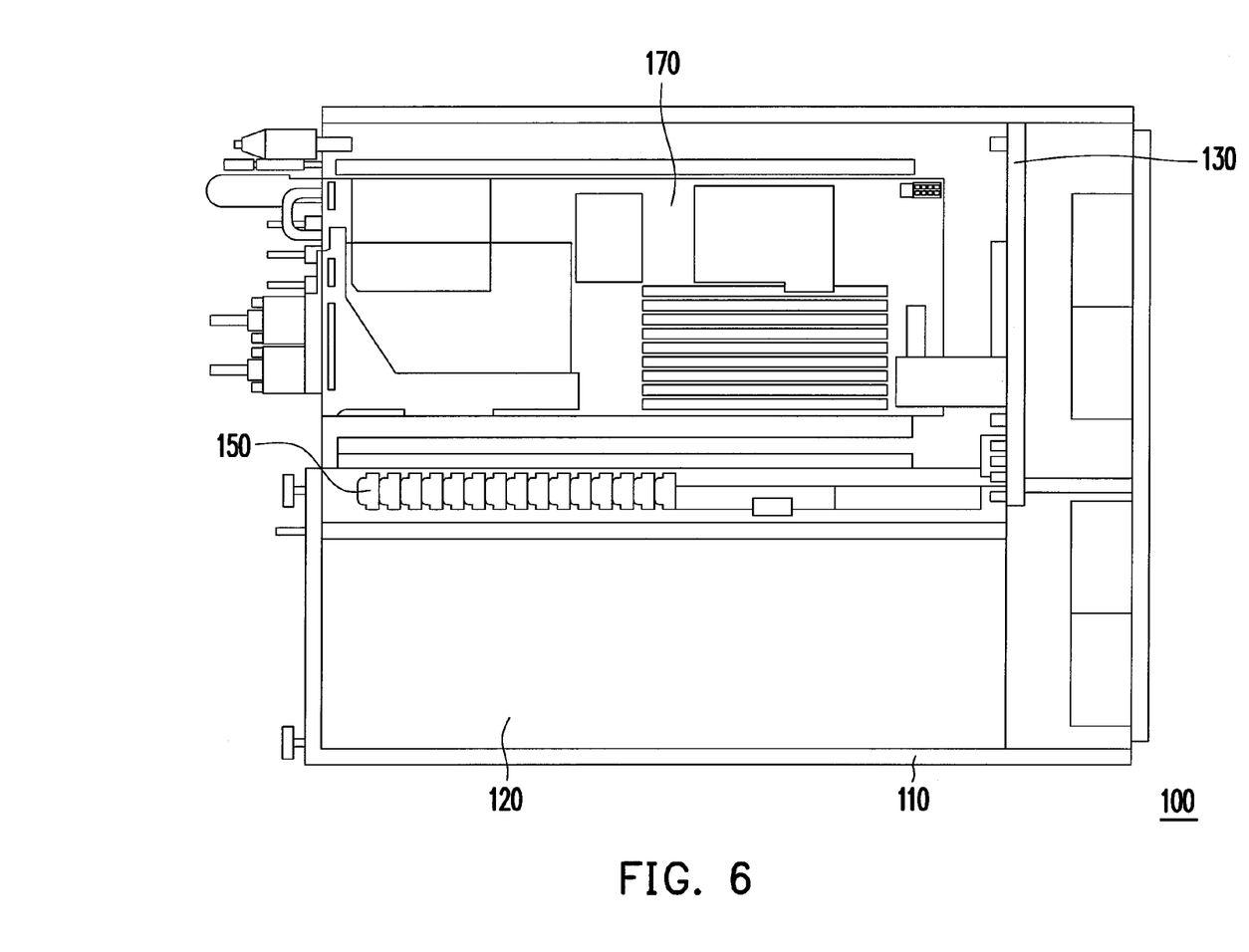
FIG. 6 is a top view of a computer device in FIG. 1.

FIG. 6 is a top view of the computer device in FIG. 1. In order to make the drawings more clear, a top surface of the chassis 110 is not depicted in FIG. 6. Referring to FIG. 6, a computer device 100 in this embodiment further includes a motherboard module 170. The motherboard module 170 is disposed in the chassis 110, and the cable arranging module 150 is located between the motherboard module 170 and the electronic module 120. Through such a high density disposal mode, the computer device 100 may have a smaller volume, so as to save a dispose space.

Figure 7:
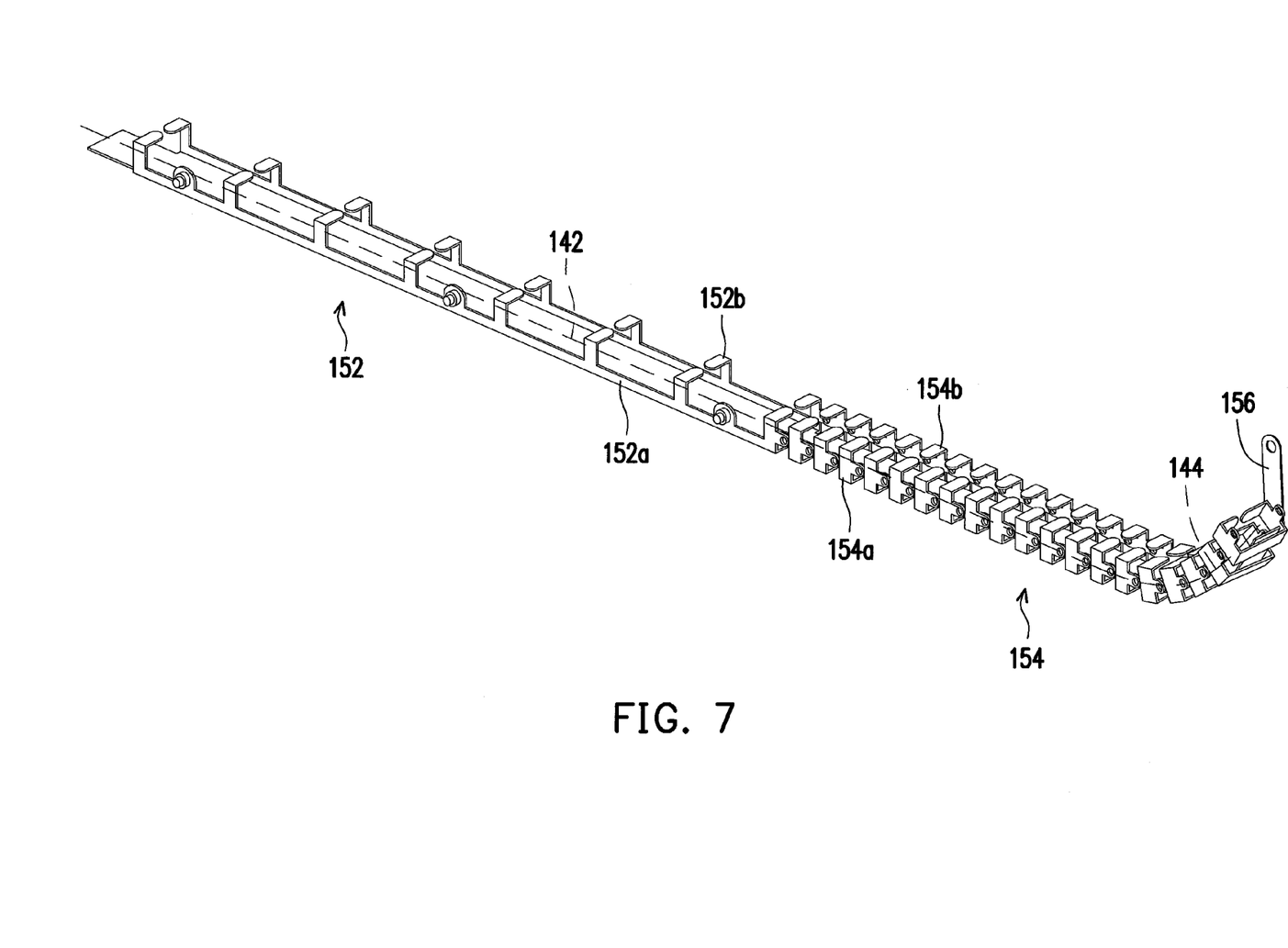
FIG. 7 is a 3D view of a fixed frame and a flexible frame in FIG. 5.

FIG. 7 is a 3D view of a fixed frame and a flexible frame in FIG. 5. Referring to FIG. 7, in this embodiment, the fixed frame 152 includes a body 152a and a plurality of position-limiting arms 152b. The position-limiting arms 152b extend out from the body 152a. Each first segment 142 (indicated by dotted lines) is limited on the body 152a by the position-limiting arms 152b, so as to fix the cable set 140 (indicated in FIG. 2). In addition, the flexible frame 154 includes a plurality of pivotal connecting pieces 154a. The pivotal connecting pieces 154a are pivotally connected in sequence to form a chain structure, thus being suitable for bending. Each pivotal connecting piece 154a has at least a position-limiting arm 154b, each second segment 144 (indicated by dotted lines) is limited on the pivotal connecting piece 154a by the position-limiting arm 154b, so as to fix the cable set 140 (indicated in FIG. 2).

Referring to FIGS. 4 and 5, in this embodiment, the cable arranging module 150 further includes a connecting rod 156. An end of the connecting rod 156 is pivotally connected to the electronic module 120, and the other end of the connecting rod 156 is pivotally connected to the flexible frame 154. An angle of the connecting rod 156 relative to the flexible frame 154 can be designed so it is easier for a user to drive the whole structure to actuate between FIGS. 4 and 5.

In conclusion, the cable arranging module of the present invention is formed of the fixed frame and the flexible frame, and the cable set is fixed at the fixed frame and the flexible frame. When the electronic module moves relative to the chassis along the rail, partial segments of the cable set bend with the flexible frame, so the actuation of the whole structure has a sufficient degree of freedom. An end of the flexible frame is connected to the electronic module, so as to maintain relative positions of the end of the cable set and the electronic module, so the cable set does not fall off from the electronic module due to movement of the electronic module. In addition, the flexible frame is partially supported on the rail and moves along the rail, thus preventing the flexible frame from irregular bending, so as to further reducing the probability that the cable set falls off from the electronic module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer device, comprising: a chassis; a rail, disposed in the chassis; an electronic module included at least one hard disk module, slidably disposed on the rail and suitable for sliding out the chassis along the rail; a cable set, connected to the electronic module; and a cable arranging module located between a motherboard module and the electronic module, comprising: a fixed frame, disposed inside the chassis and extending along a first axis, wherein the first axis is parallel to an extending direction of the rail and located below the rail; and a flexible frame, connected between the fixed frame and the electronic module, wherein the fixed frame and the flexible frame comprise a plurality of L-shaped position-limiting arms and form a containing space, and the cable set is located in the containing space and limited by the position-limiting arms; wherein when the electronic module is located in the chassis, a part of the flexible frame is supported on the rail and located along a second axis which is parallel to the first axis, and when the electronic module slides out of the chassis along the rail, the flexible frame supported on the rail moves away from the rail along the second axis and at least partially moves to the first axis, and a part of the cable set bends with the flexible frame; and the electronic module comprises a boss at a connecting point which is located above the rail and connected to the cable set, the cable arranging module further comprises a connecting rod, an end of the connecting rod is pivotally connected to the boss, and the other end of the connecting rod is pivotally connected to the flexible frame.

2. The computer device according to claim 1, wherein the computer device is a server, and the electronic module is a hard disk module.

3. The computer device according to claim 2, wherein the hard disk module comprises a backplane, the backplane comprises a plurality of connectors, the cable set comprises a plurality of cables, and the cables are connected to the connectors, respectively.

4. The computer device according to claim 2, further comprising an adaptor board disposed in the chassis, wherein the cable set is connected between the adaptor board and the hard disk module.

5. The computer device according to claim 1, wherein the flexible frame comprises a plurality of pivotal connecting pieces, the pivotal connecting pieces are pivotally connected in sequence to form a chain structure, each the pivotal connecting piece comprises at least a position-limiting arm, a part of the cable set is limited on the pivotal connecting pieces by the position-limiting arms.

6. The computer device according to claim 1, wherein the cable set comprises a power line and a plurality of data transmission lines.

* * * * *